United States Patent [19]

Kawabata

[11] Patent Number: 5,550,628
[45] Date of Patent: Aug. 27, 1996

[54] DISTANCE MEASURING DEVICE

[75] Inventor: Takashi Kawabata, Kamakura, Japan

[73] Assignee: Canon Kabushiki Kaisha, Tokyo, Japan

[21] Appl. No.: 441,955

[22] Filed: May 16, 1995

Related U.S. Application Data

[63] Continuation of Ser. No. 841,776, Mar. 2, 1992, abandoned, which is a continuation of Ser. No. 693,027, Apr. 30, 1991, abandoned, which is a continuation of Ser. No. 449,383, Dec. 7, 1989, abandoned, which is a continuation of Ser. No. 820,821, Jan. 21, 1986, abandoned, which is a continuation of Ser. No. 493,975, May 12, 1983, Pat. No. 4,582,424.

[30] Foreign Application Priority Data

May 20, 1982 [JP] Japan ................... 57-83971

[51] Int. Cl.⁶ ............... G01C 3/00; G02B 7/04; G03B 3/00
[52] U.S. Cl. .............. 356/3.11; 356/3.01; 354/403; 250/201.6
[58] Field of Search .............. 356/3.01, 3.11; 354/403; 250/201.6

[56] References Cited

U.S. PATENT DOCUMENTS

| | | | |
|---|---|---|---|
| Re. 27,461 | 8/1972 | Harvey | 352/140 |
| 3,442,193 | 5/1969 | Pagel | 352/140 |
| 3,618,499 | 11/1971 | Harvey | 354/403 |
| 3,781,111 | 12/1973 | Fletcher et al. | 356/152 |
| 4,441,810 | 4/1984 | Momose et al. | 356/1 |
| 4,470,681 | 9/1984 | Johnson | 354/403 |
| 4,582,424 | 4/1986 | Kawabata | 354/403 |
| 4,983,033 | 1/1991 | Suzuki | 356/4 |

FOREIGN PATENT DOCUMENTS

| | | |
|---|---|---|
| 49-49625 | 5/1974 | Japan . |
| 55-27087 | 2/1980 | Japan . |
| 56-18710 | 2/1981 | Japan . |
| 56-137103 | 10/1981 | Japan . |
| 0097506 | 6/1982 | Japan .............. 354/403 |

OTHER PUBLICATIONS

Kojima, Akio, "A Consideration of Future Auto-Focusing Cameras", Camera Mainichi (Oct. 1981) (and English translation).

*Primary Examiner*—Stephen C. Buczinski
*Attorney, Agent, or Firm*—Fitzpatrick, Cella, Harper & Scinto

[57] ABSTRACT

A distance measuring apparatus provided with a plurality of light-emitting units and a plurality of light-receiving units. The light emission period of each of the light-emitting units is changed over at each predetermined period interval. A plurality of light-receiving elements constituting each light-receiving unit are constructed so as to receive the reflected lights from a plurality of distance measurement fields of view on an object to be photographed in a plurality of distance measurement zones obtained by dividing a range to be measured into several blocks. The input signal from each of the light-receiving elements in each of the distance measurement zones is changed over in synchronism with the light emission period of the light-emitting units and the output signals for the respective distance measurement zones are compared, whereby a distance data indicative of the distance measurement zone most approximate to the object distance is put out.

110 Claims, 3 Drawing Sheets

DISTANCE MEASURING DEVICE

This application is a continuation of application Ser. No. 07/841,776, filed Mar. 2, 1992, abandoned, which is a continuation of Ser. No. 07/693,027, filed Apr. 30, 1991, abandoned, which is a continuation of Ser. No. 07/449,383, filed Dec. 7, 1989, abandoned, which is a continuation of Ser. No. 06/820,821, filed Jan. 21, 1986, abandoned, which is a continuation of Ser. No. 06/493,975, filed May 12, 1983, now U.S. Pat. No. 4,532,424.

BACKGROUND OF THE INVENTION

1. Field of the Invention

This invention relates to a distance measuring apparatus for detecting the distance data of an object to be photographed, and in particular to a so-called active type distance measuring apparatus which emits an object distance detecting light from the photographing apparatus side toward the object to be photographed. More particularly, the present invention relates to a distance measuring apparatus using a plurality of light-emitting means and a plurality of light-receiving means.

2. Description of the Prior Art

A number of so-called active type distance measuring apparatus which apply a distance detecting light from the photographing apparatus side toward an object to be photographed have been proposed in U.S. Pat. No. 3,435,744 and others. These active type distance measuring apparatuses of the prior art are often designed such that a small spot light obtained by stopping down a light beam is projected to keep the accuracy with which the reflected light from the object to be photographed is received. Where such a spot light is used, if a plurality of objects to be photographed exist in the field of view, the spot light is applied to the position intermediate the objects with a result that the distance of a distant object in the background is detected and the picture-taking lens cannot be moved and controlled to a proper focusing position.

Further, in the apparatuses of the prior art, correct distance measurement has sometimes not been accomplished depending on the contrast or the like of the brightness of the surface of the object to be photographed.

SUMMARY OF THE INVENTION

It is a first object of the present invention to provide an apparatus which has a plurality of light-emitting means and a plurality of light-receiving means and in which the range of distance to be measured from the close distance to the infinity position is divided into a plurality of distance measurement zones, whereby distance data indicative of the distance measurement zone corresponding to the object distance is detected.

It is a second object of the present invention to provide a distance measuring apparatus in which the light emission timing of the plurality of light-emitting means is time-divided and the light-receiving means are disposed so as to receive the reflected lights from a plurality of distance measurement fields of view on an object to be photographed in each of said distance measurement zones and further, a signal detecting circuit for successively changing over and controlling the output signals from the light-receiving elements for the respective distance measurement zones in accordance with the timing of the time division of the light-emitting means is provided, whereby the distance data of the distance measurement zone most approximate to the object distance can be put out by said circuit.

It is a third object of the present invention to provide a circuit which enables an electric circuit which achieves the second object to be efficiently constructed.

The invention will become fully apparent from the following detailed description thereof taken in conjunction with the accompanying drawings.

DESCRIPTION OF THE PREFERRED EMBODIMENT

An embodiment of the present invention will hereinafter be described with reference to FIGS. 1, 2 and 3.

Figure 1:
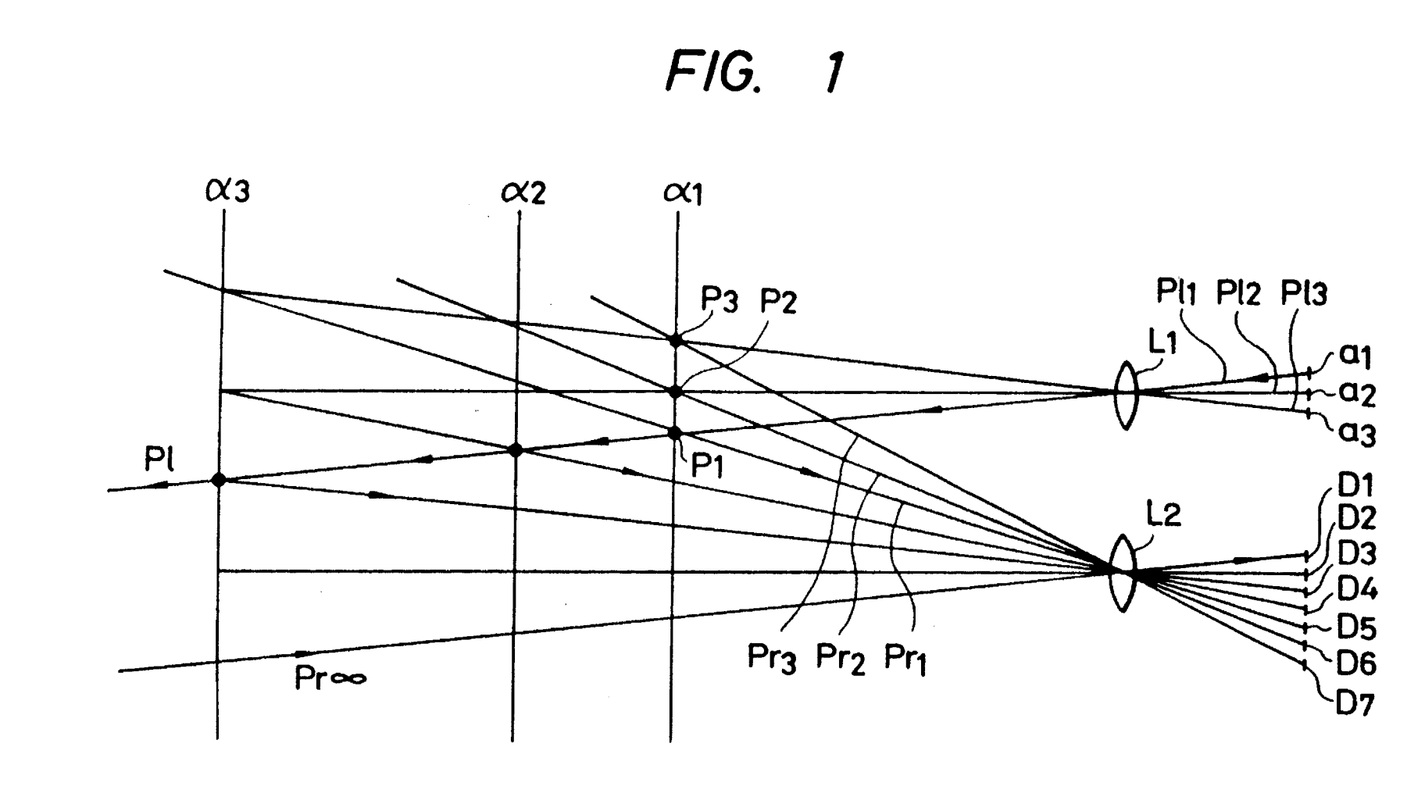
FIG. 1 illustrates the arrangement relation of a plurality of light-receiving elements for receiving the pulse lights from a plurality of light-emitting means $a_1$, $a_2$ and $a_3$.

FIG. 1 illustrates the light-emitting means according to the present invention and the relation between the light emission of the light-emitting means and the light reception. In FIG. 1, reference characters $a_1$, $a_2$ and $a_3$ designate light-emitters such as light-emitting elements which emit pulse lights of a predetermined period on the basis of the signal of a light emission control circuit shown in block A in FIG. 2. $Pl_1$, $Pl_2$ and $Pl_3$ denote the light beams from the light-emitting elements $a_1$, $a_2$ and $a_3$, respectively, and $L_1$ designates a projecting lens disposed in front of the light-emitting elements $a_1$, $a_2$, $a_3$. $\alpha_1$, $\alpha_2$ and $\alpha_3$ designate objects to be photographed lying on the photographing optical path. $Pr_1$, $Pr_2$, . . . denote the reflected light beams of the lights emitted from the light-emitting elements, reflected from the objects to be photographed. $D_1$, $D_2$, . . . , $D_7$ designate light-receiving elements such as light sensors having the photoelectric converting function. The light-receiving elements $D_1$, $D_2$, ..., $D_7$ are rectilinearly arranged rearwardly of a light-receiving lens $L_2$ and receive the reflected lights from the light-emitting elements.

The light-emitting elements $a_1$–$a_3$, the lenses $L_1$, $L_2$ and the light-receiving elements $D_1$–$D_7$ are arranged, for example, in the following manner.

In the case of the object $\alpha_1$ near the lenses $L_1$ and $L_2$, the light-receiving elements are disposed so that the reflected light $Pr_1$ by the pulse light $Pl_1$ of the first light-emitter $a_1$ is received chiefly by the fifth light-receiving element $D_5$, the reflected light by the second light-emitter $a_2$ is received chiefly by the sixth light-receiving element $D_6$ and the reflected light by the third light-emitter $a_3$ is received chiefly by the seventh light-receiving element $D_7$.

In the case of the object $\alpha_2$ slightly distant from the lenses $L_1$ and $L_2$, the light-receiving elements are disposed so that the reflected light $Pr_1$ by the first light-emitter $a_1$ is received chiefly by the fourth light-receiving element $D_4$, the reflected light by the second light-emitter $a_2$ is received chiefly by the fifth light-receiving element $D_5$ and the reflected light by the third light-emitter $a_3$ is received chiefly by the sixth light-receiving element $D_6$.

In the case of the object $\alpha_3$ more distant from the lenses $L_1$ and $L_2$, the light-receiving elements are disposed so that the reflected light $Pr_1$ by the first light-emitter $a_1$ is received chiefly by the third light-receiving element $D_3$, the reflected light by the second light-emitter $a_2$ is received chiefly by the fourth light-receiving element $D_4$ and the reflected light by the third light-emitter $a_3$ is received chiefly by the fifth light-receiving element $D_5$.

In the case of the object $\alpha_\infty$ at infinity, the light-receiving elements are disposed so that the reflected light $Pr_\infty$ by the first light-emitter $a_1$ is received chiefly by the first light-receiving element $D_1$, the reflected light by the second light-emitter $a_2$ is received chiefly by the second light-receiving element $D_2$ and the reflected light by the third light-emitter $a_3$ is received chiefly by the third light-receiving element $D_3$.

Although not shown, in the case of the object $\alpha_4$ nearer than the object $\alpha_\infty$ at infinity and more distant than the distant object $\alpha_3$, the light-receiving elements are disposed so that the reflected light by the first light-emitter $a_1$ is received chiefly by the second light-receiving element $D_2$, the reflected light by the second light-emitter $a_2$ is received chiefly by the third light-receiving element $D_3$ and the reflected light by the third light-emitter $a_3$ is received chiefly by the fourth light-receiving element $D_4$.

Accordingly, in the embodiment of FIG. 1, the distance zone of the objects $\alpha_1-\alpha_\infty$ is discriminated by being divided into five stages.

Figure 2:
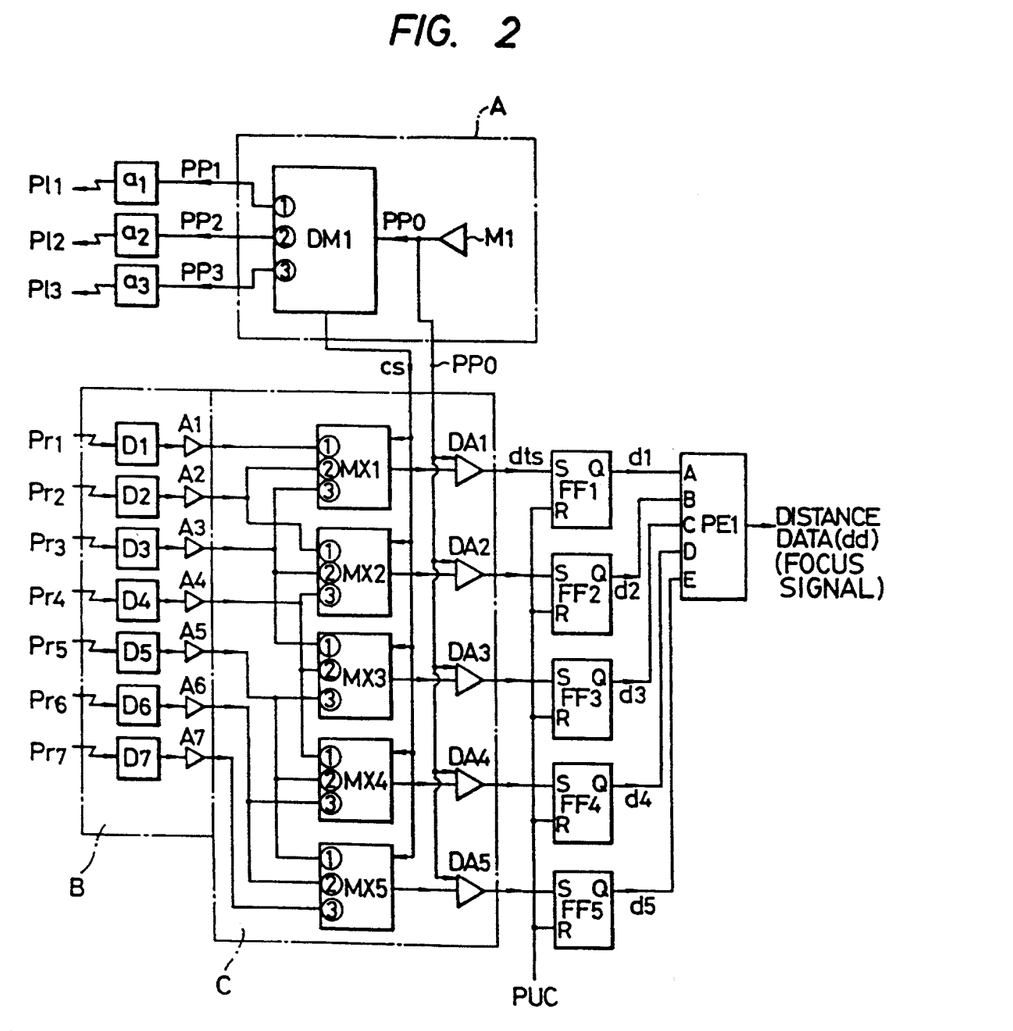
FIG. 2 diagrammatically shows the circuit of the present invention.

FIG. 2 shows the construction of a light emission control circuit A for controlling the light emission of the light-emitting elements $a_1-a_3$ of the light-emitting means described in connection with FIG. 1 and a detecting circuit receiving the output signals of the light-receiving elements as input and detecting a distance measurement zone corresponding to the object distance.

Figure 3:
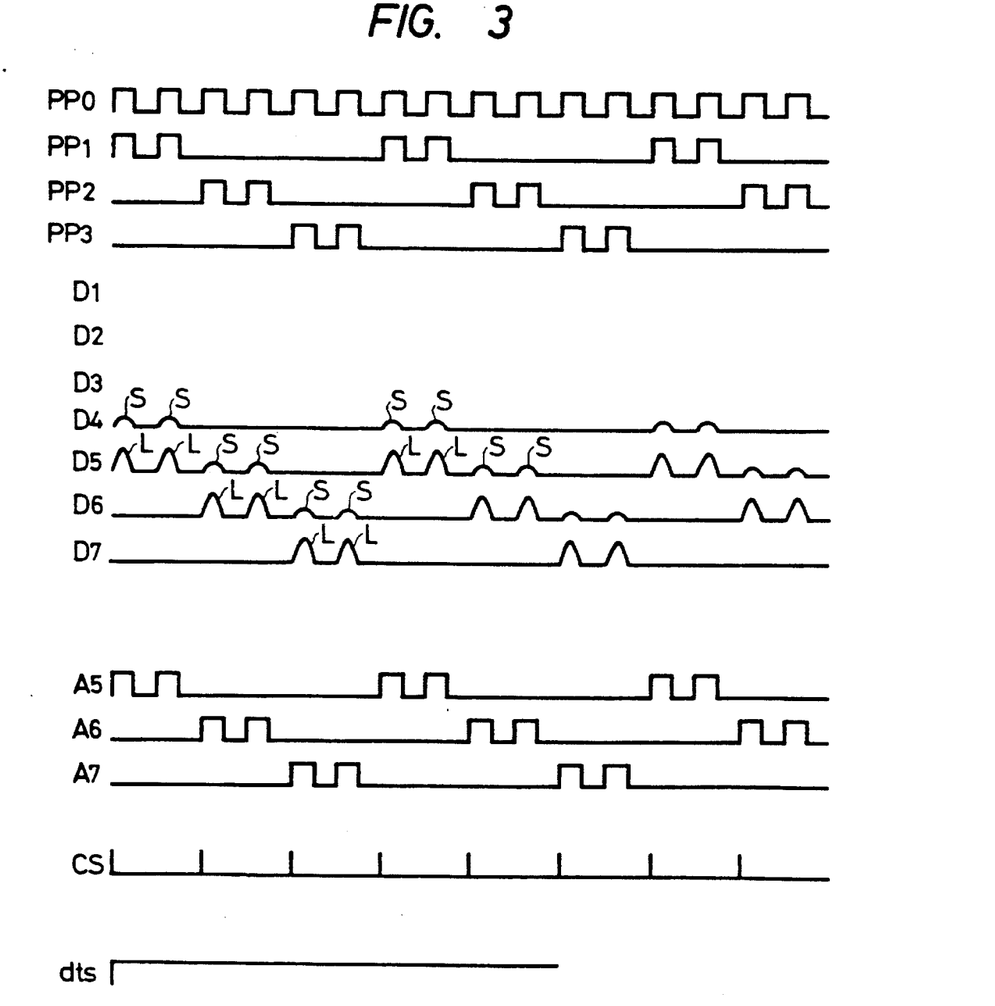
FIG. 3 shows the major output waveforms of various components in the circuit diagram of FIG. 2.

FIG. 3 shows the output waveforms of the components of the circuits of FIG. 2.

The light emission control circuit A is a drive circuit which puts out a pulse wave such as an output waveform $PP_0$ shown in FIG. 3. $DM_1$ designates a demultiplexer circuit which receives the pulse wave $PP_0$ as input and puts out the light emission pulses $PP_1$, $PP_2$ and $PP_3$ of the light-emitting elements $a_1$, $a_2$ and $a_3$, respectively, from the output terminals ①, ② and ③ thereof. $Pl_1$, $Pl_2$ and $Pl_3$ denote the light beam pulses from the respective light-emitting elements.

In FIG. 2, a block B is a light-receiving means. The light-receiving means B comprises light-receiving elements $D_1-D_7$ and amplifiers for amplifying the output signals of the light-receiving elements $D_1-D_7$. A block C designates a signal detecting circuit which comprises five multiplexers $MX_1-MX_5$ for dividing the distance measurement range into five distance measurement zones and receiving as input the output signals of the light-receiving elements receiving the reflected lights from the three distance measurement fields of view of the objects on the distance measurement zones, and detector means $DA_1-DA_5$ each comprising a synchronous detector and a comparator given a desired threshold. $FF_1-FF_5$ designate memory flip-flop circuits. $PE_1$ denotes an encoder having the priority function of receiving the signals of the flip-flops as input and putting out a distance data dd corresponding to a signal obtained by dividing into five stages the close distance to the telephoto distance in the range to be measured.

Operation of the circuit of FIG. 2 will now be described by assuming a case where the object whose distance is to be measured lies at the position $\alpha_1$ indicated in FIG. 1. The pulse lights $Pl_1-Pl_3$ from the light-emitting elements $a_1-a_3$ are applied to and reflected by three distance measurement fields of view on the objects lying in the distance measurement zones $\alpha_1-\alpha_\infty$ and are received by the elements $D_1-D_7$ of the light-receiving element group B. The emitted lights $Pl_1-Pl_3$ to the position $\alpha_1$ are reflected from the three distance measurement fields of view $P_1$, $P_2$ and $P_3$ on the position $\alpha_1$ and are received by the fifth light-receiving element $D_5$, the sixth light-receiving element $D_6$ and the seventh light-receiving element $D_7$, respectively, and the outputs of these light-receiving elements $D_5$, $D_6$ and $D_7$ are amplified by amplifiers $A_5$, $A_6$ and $A_7$, respectively.

The reflected light $Pr_1$ from the distance measurement field of view $P_1$ enters the light-receiving element $D_5$, and large output waveforms L, L, . . . are put out from this light-receiving element in synchronism with the period of light emission pulse $PP_1$ as is shown at $D_5$ in FIG. 3. The reflected light $Pr_2$ from the distance measurement field of view $P_2$ enters the light-receiving element $D_6$, and large waveforms L, L, . . . are put out from this element in synchronism with the period of light emission pulse $PP_2$ as is shown at $D_6$ in FIG. 3. Further, the reflected light $Pr_3$ from the distance measurement field of view $P_3$ enters the light-receiving element $D_7$, and waveforms L, L, . . . are put out from this element in synchronism with pulse $PP_3$ as is shown at $D_7$ in FIG. 3. The reflected light from each distance measurement field of view of the object lying at the position on $\alpha_2$ enters the light-receiving elements $D_4$, $D_5$ and $D_6$ as previously described, but since the distance object is assumed to lie on $\alpha_1$, small output waveforms S appear in the light-receiving elements $D_4$, $D_5$ and $D_6$ in synchronism with light emission pulses $PP_1-PP_3$, respectively, as is shown at $D_4$, $D_5$ and $D_6$ in FIG. 3. If the output waveforms of the light-receiving elements which have received the reflected light from each distance measurement zone are shaped and only the effective output waveforms are shown as the signals from the position on $\alpha_1$, they will be as shown at $A_5$, $A_6$ and $A_7$ in FIG. 3.

The output from the other amplifiers $A_1-A_4$ are weak signals which do not reach a predetermined level value.

The five multiplexers $MX_1-MX_5$ of the signal detecting circuit receive as inputs for each three distance measurement fields of view the signals from the light-receiving means which has received the reflected lights from each three distance measurement fields of view on five distance measurement zones. The input state when the output signals from the amplifiers $A_1-A_7$ are applied as input to the multiplexers $MX_1-MX_5$ is designed so as to be changed over into ①→②→③ in synchronism with a change-over signal CS which changes over the light emission pulse $PP_0$ of the demultiplexer $DM_1$ into light emission pulses $PP_1$, $PP_2$ and $PP_3$ of the respective light-emitting elements. The detecting circuit group $DA_1-DA_5$ receives as input the signals from the multiplexers $MX_1-MX_5$ in synchronism with the reference pulse $PP_0$, compares the output signals from the multiplexers with a predetermined reference level signal and puts out a logic signal 1 when the input value is greater than the reference level signal, and puts out a logic signal 0 when the input value is lower than the reference level signal.

In the case of the present embodiment, the input of the detecting circuit $DA_5$ which has received as input the signal of the multiplexer $MX_5$ which in turn has received the signals from the light-receiving element means $D_5-D_7$ and $A_5-A_7$ which have received the reflected light from the distance measurement zone in which the object to be photographed exists is higher than the input levels of the other detecting circuits $DA_1-DA_4$ and also greater than the reference level signal with which it is compared and therefore, a signal exhibiting a high output as a logic signal is put out from the detecting circuit $DA_5$ and no output signal is put out from the other detecting circuits $DA_1$–$DA_4$.

$FF_1$–$FF_5$ are memory flip-flops connected to the rear stages of the detecting circuits $DA_1$–$DA_5$. When a high level detection signal dts is applied as input to the flip-flops $FF_1$–$FF_5$, they are set and put out high level distance signals $d_1$–$d_5$. The flip-flops $FF_1$–$FF_5$ are reset by a reset signal puc put out from means, not shown.

$PE_1$ designates an encoder having the priority function. It is connected to the rear stage of the group of flip-flops $FF_1$–$FF_5$ and receives as input any one of distance signals $d_1$–$d_5$ corresponding to the zones of five distance stages and puts out a distance data dd corresponding to the distance signal. This distance data may be either digital or analog. For example, the distance signal $d_1$ corresponds to the most distant zone. In other words, in the case of the object $\theta_\infty$ at infinity shown in FIG. 1, the distance signal $d_1$ is applied as input to the encoder $PE_1$ and an infinity distance data dd is put out from the encoder. The distance signal $d_5$ corresponds to the nearest zone and in this case, a distance data dd indicative of the shortest distance is likewise put out from the encoder $PE_1$.

When the plurality of distance signals $d_1$–$d_5$ are applied as input to the encoder $PE_1$, the priority function of the encoder works and the distance signals $d_1$–$d_5$ indicative of the short distance are selected and a distance data dd corresponding to the distance signal is put out.

Where sensors having an accumulating effect and capable of selectively reading out such as MOS photosensors are utilized as the light-receiving elements $D_1$–$D_7$, the multiplexers $MX_1$–$MX_5$ in the embodiment may be constructed within the sensors and the first-stage amplifiers $A_1$–$A_7$ may be omitted.

As described above, the light-receiving elements $D_1$–$D_7$ (including the first-stage amplifiers $A_1$–$A_7$) are used in common to effect a plurality of measurements by a plurality of narrow-width pulse lights Pl and from the result thereof, distance measurement display or automatic focusing may be effected, whereby distance measurement hardly affected by the patterns or conditions of the objects $\theta_1$–$\theta_\infty$ to be photographed becomes possible.

Moreover, there is a merit that the number of the light-receiving elements $D_1$–$D_7$ on the light-receiving circuit side is only slightly increased and the circuit, particularly, the multiplexers $MX_1$–$MX_5$ and subsequent demodulating portions can be used in common and thus, the circuit is not so bulky.

There is also a merit that the adjustment is substantially the same as that in the prior art because of the integration of the plurality of light-emitters $a_1$–$a_3$ and the integration of the light-receiving elements $D_1$–$D_7$.

What I claim is:

1. An apparatus for forming a signal for use with focusing, comprising:

means for projecting light with different angles toward at least two target directions, said projecting means including at least two means for generating said light;

means for receiving light with different angles from at least said two target directions, said means for receiving light outputting a signal which varies in accordance with receiving positions of the receives light; and means for forming said signal for use with focussing in accordance with the signal output from said receiving means.

2. An apparatus for forming a signal for use with focusing, comprising:

means for projecting light with different angles toward at least two target directions;

means for receiving light with different angles from at least said two target directions, said means for receiving light outputting a signal which varies in accordance with receiving positions of the received light;

means for compensating an annular deviation of said light from at least said two target directions by correcting a signal from said receiving means so as to represent the same value when said light from at least said two target directions comes from substantially the same distance; and means for forming said signal for use with focusing in accordance with the signal output from said receiving means.

3. An apparatus for forming a signal for use with focusing, comprising:

means for projecting light with different angles toward at least two target directions, said projecting means including fixed optical direction means for directing said light toward at least said two target directions, said projecting means projecting said light toward at least said two target directions at different time periods;

means for receiving light with different angles from at least said two target directions, said means for receiving light outputting a signal which varies in accordance with receiving positions of the received light; and means for forming said signal for use with focusing in accordance with the signal output from said receiving means.

4. An apparatus for forming a signal for use with focusing, comprising:

means for projecting light with different angles toward at least two target directions;

means for receiving light with different angles from at least said two target directions, said receiving means including different areas for respectively receiving said light from at least said two target directions, said means for receiving light outputting a signal which varies in accordance with receiving positions of the received light; and means for forming said signal for use with focusing in accordance with the signal output from said receiving means.

5. An apparatus for forming a signal for use with focusing, comprising:

means for projecting light toward at least two target directions:

means for receiving light with different angles from the at least two target directions, said means for receiving light outputting a signal which varies in accordance with receiving positions of the received light;

means for compensating for an angular deviation of said light from at least said two target directions by correcting a signal from said receiving means so as to represent the same value when said light from at least said two target direction comes from substantially the same distance; and means for forming said signal for use with focusing in accordance with the signal output from said receiving means.

6. An apparatus for forming a signal for use with focusing, comprising:

means for projecting light toward at least two target directions;

means for receiving light with different angles from the at least two target directions, said receiving means including different areas for respectively receiving said light from at least said two target directions, said means for receiving light outputting a signal which varies in accordance with receiving positions of the received light; and means for forming said signal for use with focusing in accordance with the signal output from said receiving means.

7. An apparatus according to any one of claims 1, 2, 3, and 4, wherein said projecting means includes means for projecting said light toward three target directions.

8. An apparatus according to any one of claims 2, 3, and 4, wherein said projecting means includes at least two means for generating said light.

9. An apparatus according to claim 8, wherein at least said two generating means includes means for generating said light at different time periods.

10. An apparatus according to any one of claims 1, 2, 3, and 4, wherein said projecting means includes three means for generating said light.

11. An apparatus according to any one of claims 1, 2, 3, and 4, wherein said projecting means includes means for projecting said light toward at least said two target directions at different time periods.

12. An apparatus according to any one of claims 1, 2, 3, and 4, wherein said projecting means includes means for projecting said light toward three target directions at different periods.

13. An apparatus according to any one of claims 1, 2, 3, 4, 5, and 6, wherein said receiving means includes means for producing said signal corresponding to a receiving position of said light on said receiving means.

14. An apparatus according to claim 13, wherein said forming means includes means for storing said signal from said receiving means.

15. An apparatus according to claim 13, wherein said forming means includes means for selecting one of the signals from said receiving means corresponding to said light from at least said two target directions.

16. An apparatus according to claim 13, wherein said forming means includes means for comparing signals from said receiving means corresponding to said light from at least said two target directions.

17. An apparatus according to any one of claims 1, 2, 3, 4, 5, and 6, wherein said receiving means includes means for producing said signal corresponding to a receiving position of said light on said receiving means, said receiving position being in accordance with a distance from which said light comes.

18. An apparatus according to claim 17, wherein said forming means includes means for storing said signal from said receiving means.

19. An apparatus according to claim 17, wherein said forming means includes means for selecting one of the signals from said receiving means corresponding to said light from at least said two target directions.

20. An apparatus according to claim 17, wherein said forming means includes means for comparing signals from said receiving means corresponding to said light from at least said two target directions.

21. An apparatus according to any one of claims 1, 2, 3, 4, 5, and 6, wherein said receiving means includes means for producing said signal in accordance with a distance from which said light comes.

22. An apparatus according to claim 21, wherein said forming means includes means for storing said signal from said receiving means.

23. An apparatus according to claim 21, wherein said forming means includes means for selecting one of the signals from said receiving means corresponding to said light from at least said two target directions.

24. An apparatus according to claim 21, wherein said forming means includes means for comparing signals from said receiving means corresponding to said light from at least said two target directions.

25. An apparatus according to any one of claims 1, 2, 3, 4, 5, and 6, wherein said forming means includes means for storing said signal from said receiving means.

26. An apparatus according to any one of claims 1, 2, 3, 4, 5, and 6, wherein said forming means includes means for selecting one of the signals from said receiving means corresponding to said light from at least said two target directions.

27. An apparatus according to any one of claims 1, 2, 3, 4, 5, and 6, wherein said forming means includes means for comparing signals from said receiving means corresponding to said light from at least said two target directions.

28. An apparatus according to any of claims 1, 2, 3, 4, 5, and 6, wherein said receiving means includes means for receiving said light coming from at least two different distances of the same target direction.

29. An apparatus according to any one of claims 1, 4, and 6, wherein said forming means includes means for compensating for an angular deviation of said light from at least said two target directions by correcting said signal from said receiving means so as to represent the same value when said light from at least said two target directions comes from substantially the same distance.

30. An apparatus according to claim 29, wherein said forming means includes means for storing a signal corrected by said compensating means.

31. An apparatus according to claim 29, wherein said forming means includes means for selecting one of the signals corrected by said compensating means.

32. An apparatus according to claim 29, wherein said forming means includes means for comparing signals corrected by said compensating means.

33. An apparatus according to any one of claims 2 and 5, wherein said forming means includes means for storing a signal corrected by said compensating means.

34. An apparatus according to any one of claims 2 and 5, wherein said forming means includes means for selecting one of the signals corrected by said compensating means.

35. An apparatus according to any one of claims 2 and 5, wherein said forming means includes means for comparing signals corrected by said compensating means.

36. An apparatus according to claim 4, wherein said projecting means includes fixed optical direction means for directing said light toward at least said two target directions.

37. An apparatus according to claim 36, wherein said projecting means includes means for projecting said light toward at least said two target directions at different time periods.

38. An apparatus according to claim 36, wherein said fixed optical direction means includes a lens.

39. An apparatus according to claim 3, wherein said fixed optical direction means includes a lens.

40. An apparatus according to any one of claims 1, 2, 3, 4, 5, and 6, wherein said receiving means includes a common optical means for receiving said light from at least said two target directions.

41. An apparatus according to claim 40, wherein said common optical means includes a lens.

42. An apparatus according to claim 40, wherein said forming means includes means for storing said signal from said receiving means.

43. An apparatus according to claim 40, wherein said forming means includes means for selecting one of the signals from said receiving means corresponding to said light from at least said two target directions.

44. An apparatus according to claim 40, wherein said forming means includes means for comparing signals from said receiving means corresponding to said light from at least said two target directions.

45. An apparatus according to any one of claims 1, 2, 3, 4, 5, and 6, wherein said receiving means includes an at least partly common area for receiving said light from at least said two target directions.

46. An apparatus according to any one of claims 1, 2, 3, 4, 5, and 6, wherein said receiving means includes at least partly different sensors for receiving said light from at least said two target directions.

47. An apparatus according to any one of claims 1, 2, 3, 4, 5, and 6, wherein said forming means includes means for forming said signal for use with focusing by processing as information a signal from said receiving means corresponding to light coming from a relatively near distance of at least said two target directions.

48. An apparatus according to any one of claims 1, 2, 3, and 4, wherein said receiving means includes means for processing at least partly different signals from said receiving means in accordance with at least said two target directions toward which said projecting means projects said light.

49. An Apparatus according to any one of claims 1, 2, 3, 4, 5, and 6, wherein said forming means includes means for processing at least partly different signals from said receiving means in accordance with at least said two target directions.

50. An apparatus according to any one of claims 1, 2, 3, and 4, wherein said receiving means includes means for at least partly changing signals from said receiving means in accordance with at least said two target directions toward which said projecting means projects said light.

51. An apparatus according to any one of claims 1, 2, 3, 4, 5, and 6, wherein said forming means includes means for at least partly changing signals from said receiving means in accordance with at least said two target directions.

52. An apparatus according to any one of claims 1, 2, 3, 4, 5, and 6, wherein said forming means includes means for comparing said signal from said receiving means with a predetermined value.

53. An apparatus according to claim 52, wherein said comparing means includes means for not using said signal when said signal is lower than said predetermined value.

54. An apparatus according to any one of claims 1, 2, 3, 4, 5, and 6, wherein said forming means includes means for determining said signal from said receiving means.

55. An apparatus according to claim 54, wherein said determining means includes means for determining whether a level of said signal is lower than a predetermined level.

56. An apparatus according to claim 55, wherein said determining means includes means for not using said signal when the level of said signal is lower than said predetermined level.

57. An apparatus for forming a signal for use with focusing, comprising:

means for projecting a signal with different angles toward at least two target directions, said projecting means including at least two means for generating the projected signal;

means for receiving signals with different angles from at least said two target directions, said means for receiving signals outputting a signal which varies in accordance with receiving positions of the received signals; and means for forming said signal for use with focusing in accordance with the signal output from said receiving means.

58. An apparatus for forming a signal for use with focusing, comprising:

means for projecting a signal with different angles toward at least two target directions;

means for receiving signals with different angles from at least said two target directions, said means for receiving signals outputting a signal which varies in accordance with receiving positions of the received signals;

means for compensating an angular deviation of said received signals from at least said two target directions by correcting a signal from said receiving means so as to represent the same value when said received signals from at least said two target directions comes from substantially the same distance; and means for forming said signal for use with focusing in accordance with the signal output from said receiving means.

59. An apparatus for forming a signal for use with focusing, comprising:

means for projecting a signal with different angles toward at least two target directions, said projecting means including fixed direction means for directing said signal toward at least said two target directions, said projecting means projecting said signal toward at least said two target directions at different time periods;

means for receiving signals with different angles from at least said two target directions, said means for receiving signals outputting a signal which varies in accordance with receiving positions of the received signals; and means for forming said signal for use with focusing in accordance with the signal output from said receiving means.

60. An apparatus for forming a signal for use with focusing, comprising:

means for projecting a signal with different angles toward at least two target directions;

means for receiving signals with different angles from at least said two target directions, said receiving means including different areas for respectively receiving said signals from at least said two target directions, said means for receiving signals outputting a signal which varies in accordance with receiving positions of the received signals; and means for forming said signal for use with focusing in accordance with the signal output from said receiving means.

61. An apparatus according to any one of claims 57, 58, 59, and 60, wherein said projecting means includes means for projecting said signal toward three target directions.

62. An apparatus according to any one of claims 58, 59, and 60, wherein said projecting means includes at least two means for generating said signal.

63. An apparatus according to claim 62, wherein at least said two generating means includes means for generating said signal at different time periods.

64. An apparatus according to any one of claims 57, 58, 59, and 60, wherein said projecting means includes three means for generating said signal.

65. An apparatus according to any one of claims 57, 58, 59, and 60, wherein said projecting means includes means for projecting said signal toward at least said two target directions at different time periods.

66. An apparatus according to any one of claims 57, 58, 59, and 60, wherein said projecting means includes means for projecting said signal toward three target directions at different periods.

67. An apparatus according to any one of claims 57, 58, 59, and 60, wherein said receiving means includes means for producing said signal corresponding to a receiving position of said received signals on said receiving means.

68. An apparatus according to claim 67, wherein said forming means includes means for storing said signal from said receiving means.

69. An apparatus according to claim 67, wherein said forming means includes means for selecting one of the signals from said receiving means corresponding to said received signals from at least said two target directions.

70. An apparatus according to claim 67, wherein said forming means includes means for comparing signals from said receiving means corresponding to said received signals from at least said two target directions.

71. An apparatus according to any one of claims 57, 58, 59, and 60, wherein said receiving means includes means for producing said signal corresponding to a receiving position of said received signals on said receiving means, said receiving position being in accordance with a distance from which said received signals come.

72. An apparatus according to claim 71, wherein said forming means includes means for storing said signal from said receiving means.

73. An apparatus according to claim 71, wherein said forming means includes means for selecting one of the signals from said receiving means corresponding to said received signals from at least said two target directions.

74. An apparatus according to claim 71, wherein said forming means includes means for comparing signals from said receiving means corresponding to said received signals from at least said two target directions.

75. An apparatus according to any one of claims 57, 58, 59 and 60, wherein said receiving means includes means for producing said signal in accordance with a distance from which said received signals come.

76. An apparatus according to claim 75, wherein said forming means includes means for storing said signal from said receiving means.

77. An apparatus according to claim 75, wherein said forming means includes means for selecting one of the signals from said receiving means corresponding to said received signals from at least said two target directions.

78. An apparatus according to claim 75, wherein said forming means includes means for comparing signals from said receiving means corresponding to said received signals from at least said two target directions.

79. An apparatus according to any one of claims 57, 58, 59, and 60, wherein said forming means includes means for storing said signal from said receiving means.

80. An apparatus according to any one of claims 57, 58, 59, and 60, wherein said forming means includes means for selecting one of the signals from said receiving means corresponding to said received signals from at least said two target directions.

81. An apparatus according to any one of claims 57, 58, 59, and 60, wherein said forming means includes means for comparing signals from said receiving means corresponding to said received signals from at least said two target directions.

82. An apparatus according to any of claims 57, 58, 59, and 60, wherein said receiving means includes means for receiving said received signals coming from at least two different distances of the same target direction.

83. An apparatus according to any one of claims 57 or 60, wherein said forming means includes means for compensating for an angular deviation of said received signals from at least said two target directions by correcting said signal from said receiving means so as to represent the same value when said received signals from at Least said two target directions comes from substantially the same distance, 84. An apparatus according to claim 83, wherein said forming means includes means for storing a signal corrected by said compensating means.

85. An apparatus according to claim 83, wherein said forming means includes means for selecting one of the signals corrected by said compensating means.

86. An apparatus according to claim 83, wherein said forming means includes means for comparing signals corrected by said compensating means.

87. An apparatus according to claim 58, wherein said forming means includes means for storing a signal corrected by said compensating means.

88. An apparatus according to claim 58, wherein said forming means includes means for selecting one of the signals corrected by said compensating means.

89. An apparatus according to claim 58, wherein said forming means includes means for comparing signals corrected by said compensating means.

90. An apparatus according to claim 60, wherein said projecting means includes fixed direction means for directing the projected signal toward at least said two target directions.

91. An apparatus according to claim 90, wherein said projecting means includes means for projecting said projected signal toward at least said two target directions at different time periods.

92. An apparatus according to claim 90, wherein said fixed direction means includes a lens.

93. An apparatus according to claim 59, wherein said fixed direction means includes a lens.

94. An apparatus according to any one of claims 57, 58, 59 or 60, wherein said receiving means includes a common means for receiving said received signals from at least said two target directions.

95. An apparatus according to claim 94, wherein said common means includes a lens.

96. An apparatus according to claim 94, wherein said forming means includes means for storing said signal from said receiving means.

97. An apparatus according to claim 94, wherein said forming means includes means for selecting one of the signals from said receiving means corresponding to said received signals from at least said two target directions.

98. An apparatus according to claim 94, wherein said forming means includes means for comparing signals from said receiving means corresponding to said received signals from at least said two target directions.

99. An apparatus according to any one of claims 57, 58, 59, or 60, wherein said receiving means includes an at least partly common area for receiving said received signals from at least said two target directions.

100. An apparatus according to any one of claims 57, 58, 59, or 60, wherein said receiving means includes at least partly different sensors for receiving said received signals from at least said two target directions.

101. An apparatus according to any one of claims 57, 58, 59, or 60, wherein said forming means includes means for forming said signal for use with focusing by processing as information a signal from said receiving means corresponding to a signal coming from a relatively near distance of at least said two target directions.

102. An apparatus according to any one of claims 57, 58, 59 or 60, wherein said receiving means includes means for processing at least partly different signals from said receiving means in accordance with at least said two target directions toward which said projecting means projects said projected signal.

103. An apparatus according to any one of claims 57, 58, 59, or 60, wherein said forming means includes means for processing at least partly different signals from said receiving means in accordance with at least said two target directions.

104. An apparatus according to any one of claims 57, 58, 59 ore 60, wherein said receiving means includes means for at least partly changing signals from said receiving means in accordance with at least said two target directions toward which said projecting means projects said projected light.

105. An apparatus according to any one of claims 57, 58, 59, or 60, wherein said forming means includes means for at least partly changing signals from said receiving means in accordance with at least said two target directions.

106. An apparatus according to any one of claims 57, 58, 59, or 60, wherein said forming means includes means for comparing said signal from said receiving means with a predetermined value.

107. An apparatus according to claim 106, wherein said comparing means includes means for not using said signal from said receiving means when said signal from said receiving means is lower than said predetermined value.

108. An apparatus according to any one of claims 57, 58, 59, or 60, wherein said forming means includes means for determining said signal from said receiving means.

109. An apparatus according to claim 108, wherein said determining means includes means for determining whether a level of said signal from said receiving means is lower than a predetermined level.

110. An apparatus according to claim 108, wherein said determining means includes means for not using said signal from said receiving means when the level of said signal from said receiving means is lower than said predetermined level.

* * * * *

UNITED STATES PATENT AND TRADEMARK OFFICE
CERTIFICATE OF CORRECTION

PATENT NO. : 5,550,628
DATED : August 27, 1996
INVENTOR(S) : TAKASHI KAWABATA

It is certified that error appears in the above-indentified patent and that said Letters Patent is hereby corrected as shown below:

Column 3,
    line 37, "PPo" should read --PPO--

Column 5,
    line 27, "data dd" should read --data dd (e.g., a focus signal)--;
    line 61, "means for receiv-" should read --receiving means--;
    line 62, "ing light" should be deleted; and
    line 64, "receives" should read --received--.

Column 6,
    line 6, "means for receiv-" should read --receiving means--;
    line 7, "ing light" should be deleted;
    line 9, "annular" should read --angular--;
    line 27, "means for receiv-" should read --receiving means--;
    line 28, "ing light" should be deleted;
    line 41, "means" should read --receiving means--;
    line 42, "for receiving light" should be deleted;
    line 52, "the" should be deleted;
    line 53, "least two" should read --least said two--, and "means for receiving" should read --receiving means--;
    line 54, "light" should be deleted; and
    line 61, "direction" should read --directions--.

UNITED STATES PATENT AND TRADEMARK OFFICE
CERTIFICATE OF CORRECTION

PATENT NO. : 5,550,628
DATED : August 27, 1996
INVENTOR(S) : TAKASHI KAWABATA

It is certified that error appears in the above-indentified patent and that said Letters Patent is hereby corrected as shown below:

Column 7,
    line 3, "the" should be deleted;
    line 4, "least two" should read --least said two--,     line 6, "means for" should read --receiving means--; and
    line 7, "receiving light" should be deleted.

Column 9,
    line 32, "Apparatus" should read --apparatus--.

Column 10, means--;
    line 5, "ing signals" should be deleted;
    line 6, "signals;" should read --signal;--;

line 17, "ing signals" should be deleted;
    line 18, "signals;" should read --signal;--;

line 38, "ing signals" should be deleted;

UNITED STATES PATENT AND TRADEMARK OFFICE
CERTIFICATE OF CORRECTION

PATENT NO. : 5,550,628
DATED : August 27, 1996
INVENTOR(S) : TAKASHI KAWABATA

It is certified that error appears in the above-indentified patent and that said Letters Patent is hereby corrected as shown below:

Column 10,
    line 39, "signals;" should read --signal;--;

line 55, "signals;" should read --signal;--; and
    line 66, "includes" should read --include--.
Column 12,
    line 13, "Least" should read --least--; and
    line 14, "comes" should read --come--.

Signed and Sealed this

Seventeenth Day of June, 1997

Attest:

BRUCE LEHMAN

*Attesting Officer*       *Commissioner of Patents and Trademarks*